United States Patent [19]

Mayon

[11] Patent Number: 4,573,682
[45] Date of Patent: Mar. 4, 1986

[54] JOY STICK HOLDER

[75] Inventor: Allen J. Mayon, Franklin, La.

[73] Assignees: Louis J. Conque, Lafayette; Rodney P. Vincent, New Orleans, both of La.

[21] Appl. No.: 469,463

[22] Filed: Feb. 24, 1983

[51] Int. Cl.⁴ ............................................. A63B 71/00
[52] U.S. Cl. ................................. 273/148 B; 248/176
[58] Field of Search ....... 248/176, 158, 310, DIG. 10, 248/154; 24/306; 273/148 B

[56] References Cited

U.S. PATENT DOCUMENTS

| | | | |
|---|---|---|---|
| 1,161,762 | 11/1915 | Bartlett | 248/310 |
| 1,973,216 | 12/1932 | Manning | 248/310 |
| 2,067,323 | 10/1935 | Hirsch | 248/176 |
| 2,620,089 | 12/1952 | Loghem | 248/154 X |
| 3,230,909 | 3/1963 | Watson | 248/158 X |
| 3,307,740 | 3/1967 | Fant | 248/205.2 X |
| 3,321,068 | 5/1967 | Beach | 248/205.2 X |
| 3,503,581 | 3/1970 | Rouleau | 248/121 |
| 3,517,395 | 6/1970 | Shimoi | 24/306 |
| 4,168,007 | 9/1979 | Rohatensky | 248/154 X |
| 4,327,837 | 5/1982 | Ross | 248/205.2 X |
| 4,422,640 | 12/1983 | Tamarkin | 273/148 R |

FOREIGN PATENT DOCUMENTS

| | | | |
|---|---|---|---|
| 352347 | 4/1937 | Italy | 248/121 |
| 190565 | 4/1937 | Switzerland | 248/158 |

Primary Examiner—J. Franklin Foss
Attorney, Agent, or Firm—Keaty & Keaty

[57] ABSTRACT

A joy stick holder adapted to be held between the legs of an operator has a circular base, a concavo-concave middle portion and a cylindrical top section having a recess to accommodate placement of a joy stick base within the recess. Clamps attached to the vertical wall of the top section as well as Velcro material attached to the bottoms of the joy stick and the recess assist in retaining the joy stick within the recess.

1 Claim, 12 Drawing Figures

JOY STICK HOLDER

BACKGROUND OF THE INVENTION

This invention discloses a specially adapted joy stick holder particularly adapted for improving the ease of use of a joy stick or a device used for the input to a computer of a vector as commonly used in input to computers for control of visual or graphics displays.

A number of devices have been developed to aid in the input of information to computers or computerized devices which are used in the creation, manipulation, or display of graphical information. In general, graphical information requires that the user be able to input positional and directional information directly into the computer.

Very early graphics programs required that the user essentially type into a standard typewriter style keyboard a phrase or a command for each of the standard directions and for any given position. This results in a phenomenon which can be seen in current personal computers, where the user must remember that a display is forces of dots formed by intersecting vertical and horizontal lines; one will commonly see commands typed in the form of the vertical number and then a horizontal number, meaning to the computer that a dot is to be lit or extinguished at the dot at the intersection of those two lines on the display.

It can be seen from the foregoing that this is a very crude method of creating pictures on a computer, requiring extensive typing for even the simplest of figures, it is incapable of putting in any sort of rapid information.

The growth of video games has required the invention and development of simple, low cost, easily reproducible devices that are capable of inputting a great deal of graphic information very quickly. This has given rise to a number of movement sensitive devices. One is the track ball, which is a small ball moved by being rubbed by the hand, coupled to sensors which interpret the ball's movement as though it were moving a dot of light around the display screen. Another is the light pen, which is held against the display to mark a particular spot. The most common device, however, because of its ease of use, its adaptability to general human factors design, and the ease with which it can be manufactured is the joy stick.

In general, a joy stick comprises a base, and a manipulable rod or handle extending vertically out of the base. Some form of sensor is provided in the base to translate the relative position of this rod into computer compatable electrical signals. The user, in order to input positional information into the computer, will hold the base in one hand or against a surface and will push in any one of a number of directions upon the stick denoting to the computer a particular direction or movement.

The widespread growth in video games, their decreasing cost and increasing popularity, have made the joy stick a very widely seen device.

Most common joy sticks provided for video games are of extremely simply construction. In order that they may be properly mass-produced at low cost, they have very few moving parts. By comparison, an industrial joy stick, such as may be seen in the more expensive terminals used for professional graphics work, is a precision device involving compensating springs for mechanical feel and feedback to the rod and positioning potentiometers or variable resistences to detect the degree of motion of the joy stick. In some sophisticated joy stick installations, such as may be found in some military applications, there are also electro-mechanical linkages designed to give computer generated tactile feedback to the user. Such a device obviously is far too expensive for use for a video game designed for mass consumption.

As a result, the typical video game joy stick is commonly found to contain a simple switching mechanism triggered by pressure from manipulation of the rod to detect one of four directions in which the rod may have been pushed. Such switches are commonly made of various forms of spring loaded plastic and aluminum foil which may be mass produced at very low cost by using techniques developed for mass production of printed circuits; unfortunately, these switches give almost no tactile feedback through the joy stick to indicate that they have been actuated. They are simply on and off devices.

The sophistication of modern computer chips and modern microcomputers are such that the programs and software of the game manufacturer are able to compensate for the simplicity of the joy stick. However, such a joy stick produces various human factors problems in its use as may readily be determined from the realization that the simplicity of the manufacture and the reduction of the number of parts has resulted in elimination of almost all of the users sense of feel. It is common therefore to see people pushing joy sticks quite hard and the actual design of the cheaper joy sticks are such that they will readily resist these forces.

When a user is engaged in an active video game or other activity requiring rapid hand responses, the manulipulating on the rod often instead results in the user moving the entire joy stick mechanism. If this happens, no force is imposed upon the switches and the joy stick ceases to register. This leads to a situation where the joy stick actually is putting irregular inputs into the game, causing extreme frustration on the part of the user, especially in the case where the user is a small child or handicapped video game player.

It is obviously infeasible to substitute a several thousand dollar professional grade joy stick into a video game environment. It is therefore necessary if there is any improvement to be made in the manipulation of the joy stick to utilize existing joy sticks by providing some method for increasing the reliability of its use and the comfort and ease with which it may be manipulated.

SUMMARY OF THE INVENTION

This invention comprises an essentially uniformally weighted dense holder shaped and designed so as to be clamped readily between the legs of persons of varying sizes ranging from small children to full sized adults, providing a non-tippable, rigid, and relatively massive structure in comparison with the forces and massive of the joy stick.

The invention is designed to be manufactured of very inexpensive materials using simplified manufacturing processes and yet has been shaped and adapted so that the widest possible range of human users may find it satisfactory in operation.

As designed it forms a stable, non-vibratory base within which a joy stick base is firmly clamped. It is adaptable in its design to support any one of a number of commonly available, commercially produced and provided video game joy sticks.

It acts as a force transfer and stabilization mechanism, transferring the lateral forces imposed by the average human movement on the rod of a joy stick into properly vectored rotational forces about the mounting axis of the joy stick rod by immobilizing the twisting motion of the joy stick base.

It is therefore an object of this invention to securely restrain a joy stick during manipulation so as to transfer lateral forces on the handle rotationally into properly motioned forces about the joy stick pivot axis so as to properly actuate a standard joy stick.

It is a further object of this invention to hold a joy stick so as to minimize fatigue and/or soreness in the human user during long joy stick manipulation sessions.

It is a further object of this invention to provide a device with no or minimal moving parts adaptable to the lightest possible range of human shapes, sizes and physical characteristics for securely supporting joy sticks.

It is a further object of this invention to provide an environmental holder adapted to the human factors of typical users, who may range in size from small children to full sized adults, and whose responsiveness, physical reflexes and strength vary widely so that they may properly use joy sticks of a relatively cheap and inexpensive nature with comfort and reliability over an extended period of time as is typically encountered in long video game sessions.

All of these objects are met in the current invention as will be more clearly seen from the detailed description which follows herein.

DETAILED DESCRIPTION OF THE INVENTION

Figure 1:
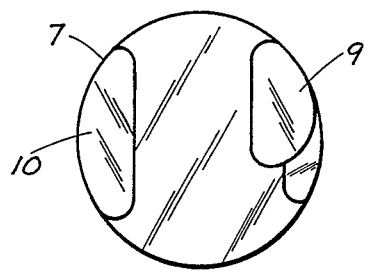
FIG. 1 is a top plain view of the first embodiment of the present invention.
Figure 2:
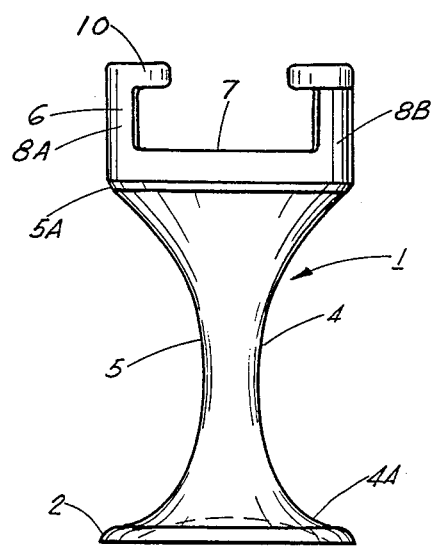
FIG. 2 is a longitudinal-section view thereof.
Figure 3:
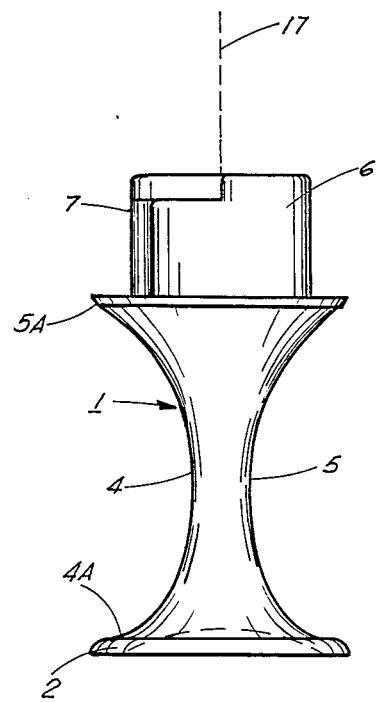
FIG. 3 is a side elevational view thereof.
Figure 4:
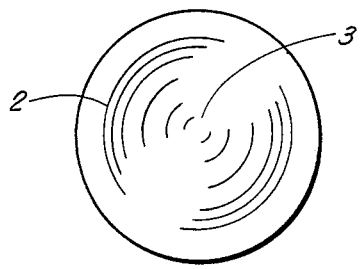
FIG. 4 is a bottom view of the apparatus of the present invention.

The invention as generally shown in FIG. 1 comprises a generally longitudinal cylindrical structure of a uniform dense mass which may be comprised of a material such as plastic in the preferred embodiment. Wood or a similar, easily formed material having a relatively low heat conductivity, no electrical conductivity, at and an average resistance to impact may also be used. The material chosen must be such that the device as constructed has a mass relatively greater than the mass of the joy stick involved.

The apparatus as shown has a generally cylindrical base 2 having a concave bottom face 3 surface thereon, rising from this base, its diameter decreases so as to provide, in side profile, sides 4 with a generally concavo-concave (in longitudinal section) curve 5 tapering from a less radius at the bottom, tapering to a greater radius at the top. At a point 5 where the radius of the curve extends outward to the diameter of the base 2 diameter, rises an upward essentially cylindrical upper portion 6 conformably somewhat higher than the thickness in the base of the joy stick to be supported and terminating in a flat top surface 7. In the preferred embodiment, said means comprises two vertically rising, opposing sections 8a, 8b, having inwardly extending, upper grasping lips 9, 10, thereupon.

Figure 5:
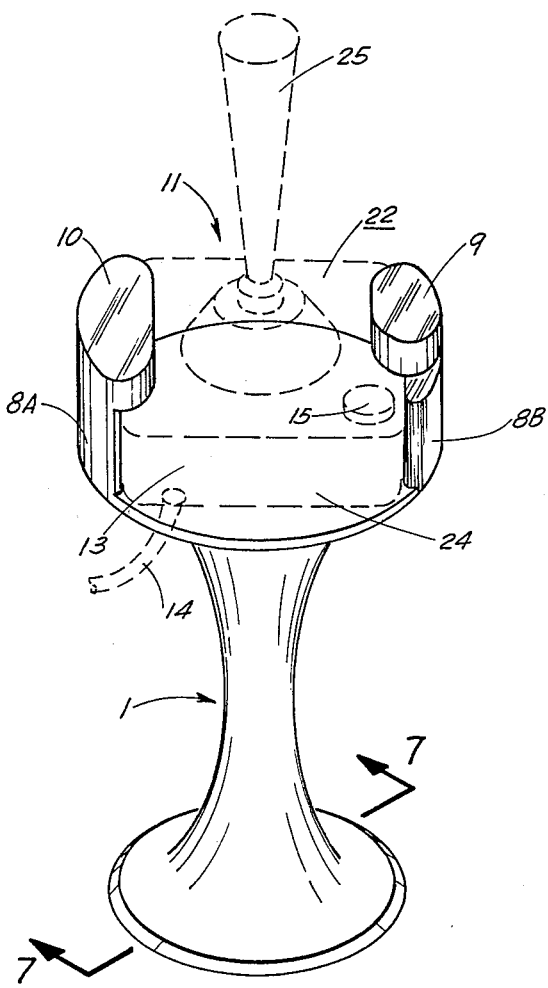
FIG. 5 is a perspective view of the first embodiment of the present invention with a joy stick in phantom lines.
Figure 8:
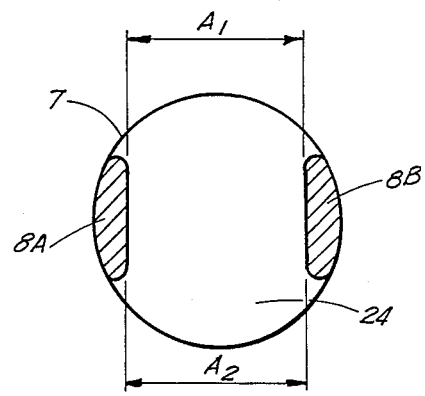
FIG. 8 is a cross-section taken along the line 8—8 of FIG. 6.
Figure 6:
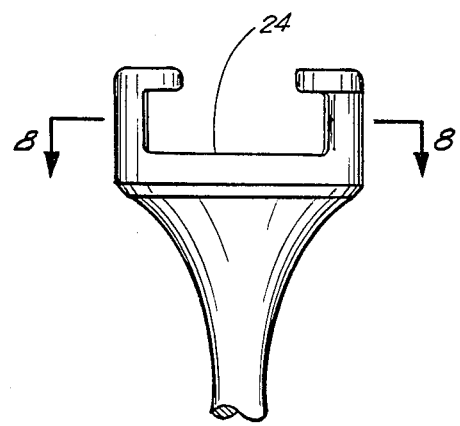
FIG. 6 is a fragmentary vertical section of the upper part of the first embodiment of the present invention.
Figure 7:
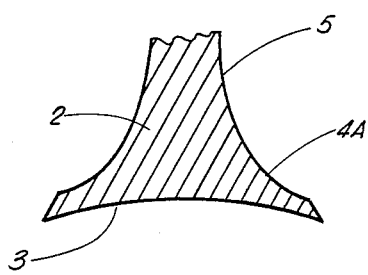
FIG. 7 is a cross-section taken along the line 7—7 in FIG. 5.
Figure 9:
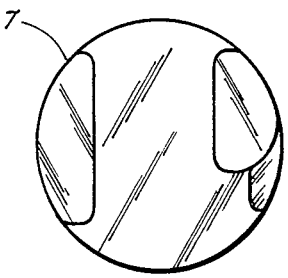
FIG. 9 is a top view of the first embodiment of the present invention.

The opposing sections are not, in the preferred embodiments, exactly paralled, but are tapered. As known to those skilled in the art, different common video game joy sticks 11, as shown in FIG. 5 while of a common physical configuration, are of sufficiently varying dimensions as to require the holder dimension to be adapted to a specific joy stick. Thus, the taper is adaptedly sized to the joy stick base, having an opening end 24 some what wider than the joy stick base, width 12 for example 1/16, and an other end dimension As matching the joy stick base width, to enhance insertability.

As is also known to those familiar with the art, joy sticks have an orientation, by reason of having a front. Side 13, for example of the Atari ® joy stick the is side designated as "Top", from which extends a control cable 14 adapted for connecting the joy stick to a video game. There is also found, in a corner formed by said front side with an adjoining side, a button 15, for manipulation. As shown in FIG. 1 and FIG. 5, one of the grasping lips, for example 9, as shown for the preferred holder adapted for the Atari joy stick, is cut away to provide clearance for said button.

Figure 10:
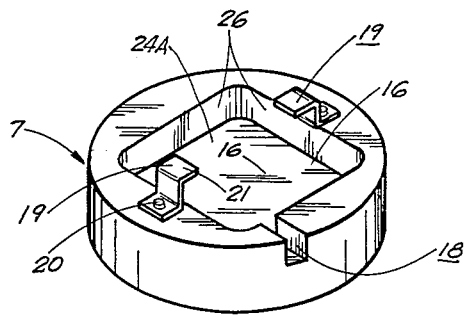
FIG. 10 is a prospective view of the top section of the second embodiment showing clamps installed.
Figure 11:
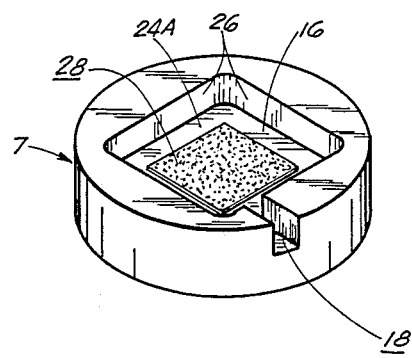
FIG. 11 is a propsective view of the top section of the second embodiment showing Velcro ® attached to the bottom of the recess.
Figure 12:
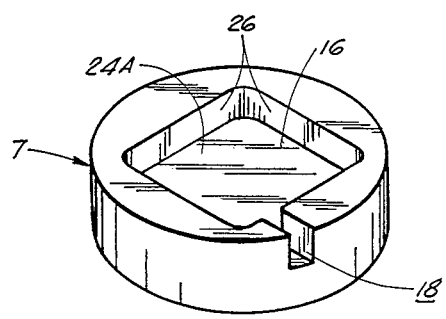
FIG. 12 is a prospective view of the top section of the second preferred embodiment of the present invention.

An alternate joy stick grasping means 7 as shown in FIG. 10, 11, or 12 comprises a top surface having a square opening 24a comprising essentially vertical sides of dimensions tolerantly greater than the outer dimensions 12 of the base the chosen joy stick 11 tapering to and terminating in a flat bottom 16 spaceable downward along the central axis 17 of the overall holder 1 by a distance somewhat less than the thickness of the base of the joy stick to be supported. A notch or groove 18 spaceable offset from one corner of the inward square extends radially outward to the outer surface of the cylindrical, top portion and is adaptably conformed to the control cable 14 found emanating from the base of the joy stick 11.

An alternate configuration of the grasping means 7, comprises a plurality of removable clasps 19, secured to the base, for example by screw 20, said clasps being formed for example of metal having a securing lip 21 clampingly engaging the top surface 22 of the base of the joystick 11.

An alternate enhancement to these alternate configurations to the grasping means 7 further comprises mating sections 28 of a known separable, interlocking material such as Velcro, comprising one such section firmly affixed, for example glued, to the bottom (not shown) of the joystick base and the mating section likewise affixed to the matching top surface of the joystick holding means 7, for example to opening flat bottom 16.

In operation the joy stick 11 is inserted with its base smoothly and tightly fitting contactedly into the opening 24, 24a of the top of the joy stick holder, being rotated so that its control table fits outward through the opening 24 or the notch 18. A human user in using the joy stick is in a seating position on a seat, the base 2 of the joy stick holder 1 is placed upon the base of the seat (not shown) between the legs of the user. The generally concave surface 3 of the base is thereby placed in contacting conjunction with the base of the seat, creating thereby a suction effect aiding the stability and resistance to motion of the holder. The particular ovoidal shape of this invention is conformably shaped to the cross-section of the widest range of human thighs when the human is in a seating position; it has been found that through a very wide range of human sizes ranging from children to large adults that the particular shape shown and revealed in this invention and disclosed herewith is optimal for the clamping to be mentioned hereinafter. The closure of the thighs upon the sides 4, of the invention produces an inward and downwardly clamping force upon the invention stablizing the base 2 against rotational or tortional forces. The user then grasps the rod or handle 25 of the joy stick in a standard method known to those skilled in the art. It has been found through experimentation that the clamping forces aforesaid upon the base and the conformably clamping force by the base to the joy stick together with the relatively greater uniform mass of the base sufficiently resists the force of the joy stick so as to transform the lateral motions imposed by the hand upon the joy stick handle 25 into properly vectored rotary motions about the pivot axis (not shown) of the joy stick thereby properly actuating the joy stick contact switches (not shown). This in turn, results in reliable, repeatable, and uniform actuation of the joy stick contacts conformable to the requirements of the average video game.

There is no requirement to physically hold, grasp, or secure the joy stick with the other hand. There is therefore a considerably reduced hand fatigue and physical discomfort on the part of the user, there being no necessity to resist the forces on the joy stick caused by the force of a hand manipulating the joy stick.

Further, this holder, in combination with an alternate joy stick having a button in the handle 26, for example the WICO ® joy stick, permits, for the first time, those handicapped persons having only one hand to use a joy stick. It has also been found that the actual forces required to manipulate the joy stick are considerably lessened as it is unnecessary to overcome or over compensate for movement of the base of the joy stick under rapid actuation. As a result the user experiences considerably reduced fatigue, has relatively few false actuations, experiences greatly reduced mental fatigue at false actuations and improper readings, and is able to manipulate and utilize the joy stick with great ease and comfort. It has been found that the shape for the cross-section 4a of the disclosed herein is optimal for the purposes of this device and therefore represents the preferred embodiment of this particular invention.

It can be seen that this invention comprises many small variances which may be obvious to those skilled in the art but which are not significant changes from the overall invention as particulary described and this disclosure includes all such changes, minor modification and reshapings.

What is claimed is:

1. A stand holder for a computer joy stick, comprising:
    a base portion;
    a middle portion having a concavo-concave longitudinal section;
    a top section provided with a recess to receive a base of the joy stick, wherein the vertical walls of the recess form a square, adaptedly sized to the dimensions of the joystick base, and one of the walls is provided with a notch extending through the walls and through the top section;
    a grasping means for securing and retaining the joy stick within the top section; and
    wherein the height of the stand and the contour of the middle portion is such so as to facilitate the positioning and gripping of the stand between the thighs.

* * * * *